United States Patent Office 2,741,967
Patented Apr. 17, 1956

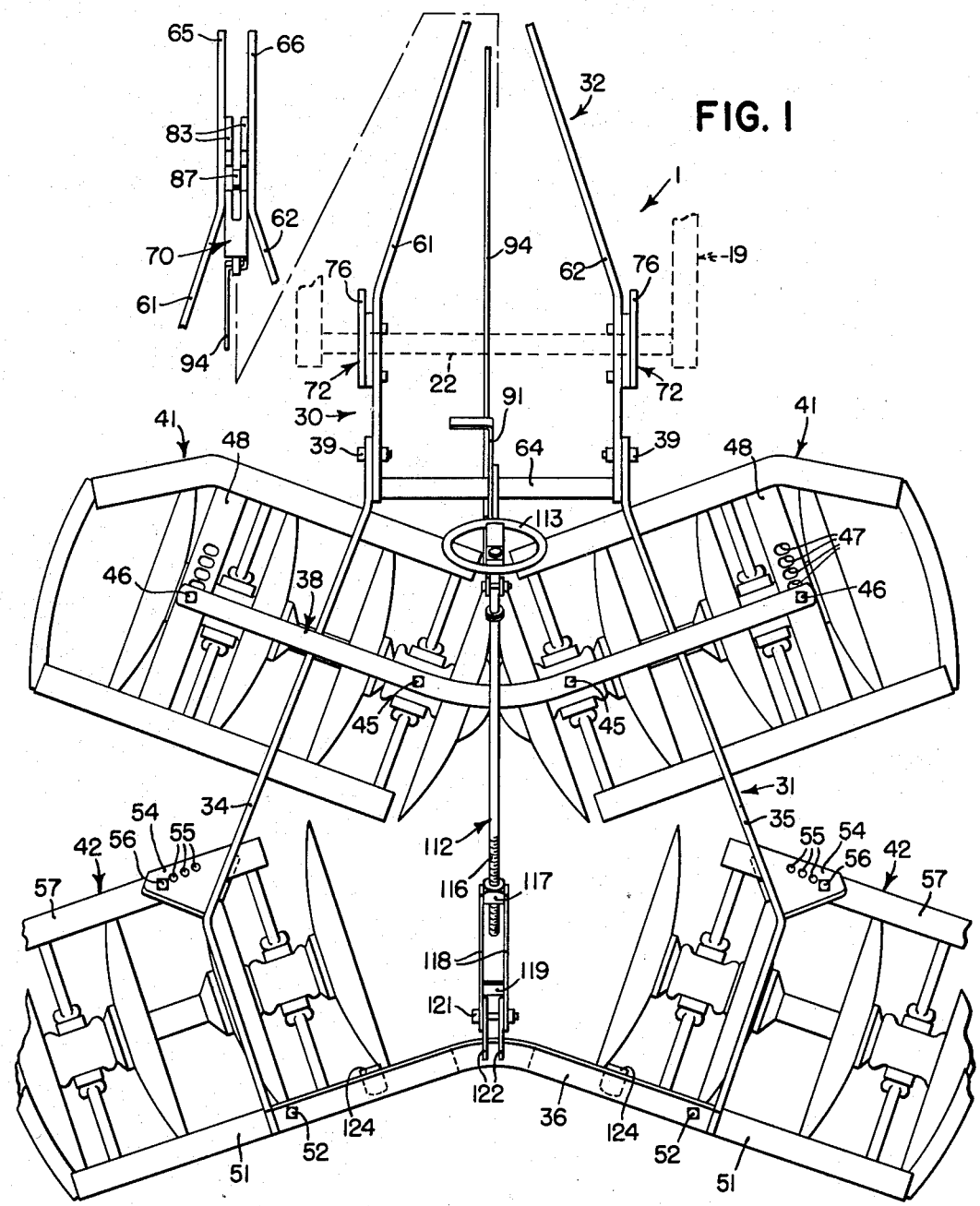

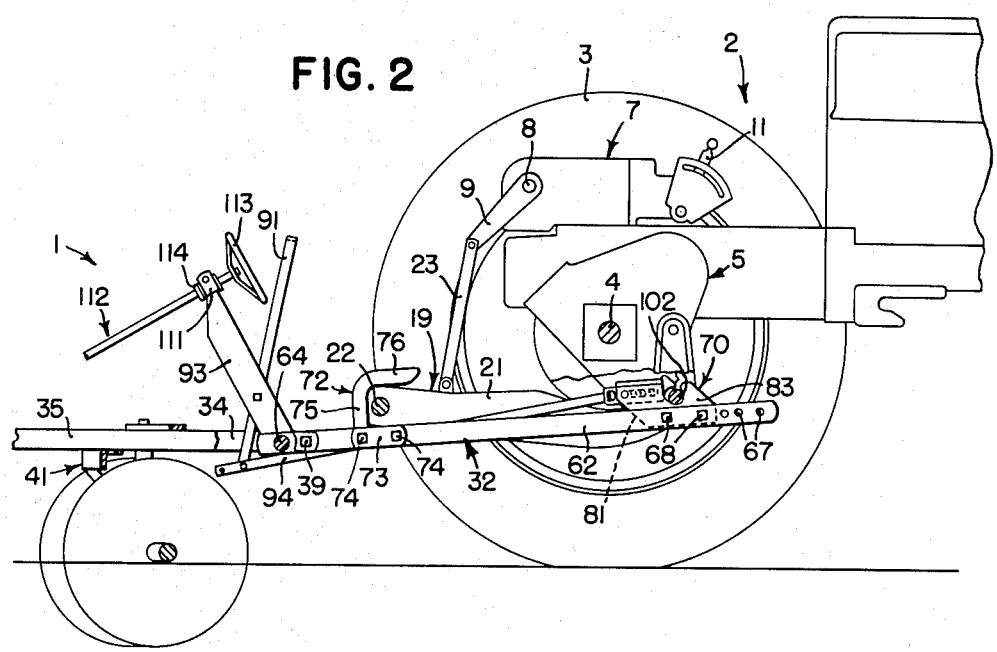

2,741,967

HITCH DEVICES

William P. Oehler and Charles H. Youngberg, Moline, Ill., assignors to Deere & Company, Moline, Ill., a corporation of Illinois Application November 20, 1950, Serial No. 196,536

1 Claim. (Cl. 97—47.14)

The present invention relates generally to agricultural implements and particularly to implements of the type that are adapted to be connected with the farm tractor to be propelled thereby.

The object and general nature of the present invention is the provision of a new and improved hitch structure for connecting the implement with the tractor so that, first, the implement may readily be connected with the tractor in draft-transmitting relation without requiring that the operator dismount from the tractor in order to manually connect parts together, and, second, the implement may be raised bodily out of ground-engaging or ground-contacting position by power derived from the tractor, whereby the need for mechanism for shifting the gangs into a straightened or forward rolling position, or for transport wheels, is entirely eliminated.

Another important feature of the present invention is the provision of an implement and associated hitch structure whereby, to connect the implement to a tractor, all that it is necessary to do is to back the tractor into position relative to the implement, then raise the drawbar of the tractor, thereby raising the front portion of the implement and automatically connecting the same in draft-transmitting relation with the tractor.

More specifically, it is a feature of this invention to provide a ground-working implement, such as a disk harrow, so constructed and arranged as to include front and rear frame sections having a limited amount of relative pivotal movement about a transverse axis, the front section serving as a hitch frame having means adapted to be engaged by the drawbar of the tractor so that, when the drawbar is raised, the upward movement of the drawbar acts to raise the front end of the hitch frame section upwardly, as permitted by the aforesaid lost-motion connection, until it is engaged with a part on the tractor, said lost-motion connection providing for a certain amount of vertical flexibility of the implement relative to the tractor. It is also a feature of this invention to provide a drawbar-receiving means on the hitch or front frame section so as to have an additional amount of vertical lost motion, providing for additional vertical flexibility as between the implement and the tractor.

These and other objects and advantages of the present invention will be apparent to those skilled in the art after a consideration of the following detailed description, taken in conjunction with the accompanying drawings, in which:

Figure 1 is a plan view of a disk harrow of the pick-up type, in which the principles of the present invention have been incorporated.

Figure 2 is a fragmentary side view, showing the front portion of the harrow, the rear portion of the tractor, and the new and improved hitch structure in which the principles of the present invention have been incorporated.

Figure 3 is a fragmentary enlarged perspective view, showing the draft-transmitting connection between the front end of the implement and the tractor, which connection is automatically effected by the lifting of the hitch frame or front frame section of the implement relative to the tractor.

Figure 4 is a view similar to Figure 2, showing the relation between the hitch parts in the process of connecting the implement to the tractor.

The disk harrow, in which the principles of the present invention have been incorporated is indicated in its entirety by the reference numeral 1 and is shown in the drawings as adapted to be connected with a farm tractor 2 of the type having a pair of rear drive wheels 3 connected to axle shafts 4 journaled for rotation in a rear axle structure 5 forming a part of the tractor. The latter is also provided with a hydraulic power lift unit 7 which includes a transverse rockshaft 8 having a pair of lift arms 9, one at each side of the tractor, and suitable means, including a valve-shifting lever 11, for controlling the application of power to the unit 7 for the purpose of rocking the shaft 8 to raise and lower the lift arms 9. The rear axle structure 5 of the tractor includes laterally outwardly extending housing sections 13, in which said axle shafts 4 are journaled, and laterally inner drop housing sections 14, each of which is provided with a bracket portion 15 in which a laterally outwardly extending drawbar-supporting pintle 16 is carried. The drawbar of the tractor is indicated in its entirety by the reference numeral 19 and includes a pair of generally parallel, rearwardly extending side sections 21 connected at their rear ends by a crossbar section 22, the forward portions of the side members 21 being journaled for vertical rocking movement on the pintles 16. The side members 21 of the drawbar 19 are connected with the associated power lift arms 9 by links or chains 23.

The implement 1, as best shown in Figure 1, comprises a disk harrow of the pick-up type, having a frame 30 which includes a rear main frame section 31 and a front frame section or hitch structure 32 pivotally connected together for relative movement about a transverse axis. The main frame section 31 comprises a pair of generally fore-and-aft extending bars 34 and 35 secured, as by welding, at their rear ends to a rear crossbar 36 which is bent in rearwardly diverging relation. Preferably, the rear frame 36 is an angle having its ends welded to the rear ends of the fore-and-aft extending frame bars 34 and 35. The frame bars 34 and 35, rearwardly of their forward ends, are secured, as by welding, to a front crossbar 38 which is bent in forwardly diverging relation, as best shown in Figure 1, the end portions of the front crossbar 38 extending laterally outwardly beyond the generally fore-and-aft extending frame bars 34 and 35. The front ends of the frame bars 34 and 35 are bent so as to extend in substantial parallelism and are apertured to receive pivot members, preferably in the form of bolts 39, by which the rear portion of the front frame section or hitch structure 32 is pivotally connected with the main frame section 31.

The main frame section 31 of the disk harrow 1 receives a pair of right- and left-hand front gangs 41 and a pair of right- and left-hand rear gangs 42. Each of these gangs is of generally conventional construction. The two front gangs 41 are pivotally connected, as at 45, to the generally central section of the front cross frame bar 38, and the laterally outwardly extending end portions of the crossbar 38 are apertured to receive a pin or bolt 46 which is disposable in any one of several slotted openings 47 formed in a crossbar 48 forming a part of the frame structure of the gangs 41. The angle between the two front gangs 41 may be varied, as desired, by removing the bolts 46, shifting the gangs into the desired angular position, and then reinserting the bolts 46 in the proper holes 47.

The rear gangs 42 are connected in a similar way to the rear portion of the main frame section 31. The laterally inner portion of the rear gang frame member 51 is apertured to receive a pivot member in the form of a bolt 52, the bolts 52 being carried in apertures formed in the ends of the rear cross frame angle 36. Each of the main frame members 34 and 35 carries a bracket 54 which is provided with a plurality of apertures 55 in any one of which the associated connecting bolt 56 may be disposed. The bolt 56 is received in a suitable aperture formed in the front angle 57 of the gang frame, and by connecting the rear gang frames to the brackets 54 in different positions, the angle between the rear gangs may be varied, as desired.

The front frame section or hitch structure 32 comprises a pair of generally fore-and-aft extending frame members 61 and 62, each of which at its rear end is apertured to receive the associated pivot bolt 39, the rear ends of the frame members 61 and 62 being rigidly interconnected by a reenforcing cross member 64, the ends of which are welded or otherwise firmly fixed to the rear ends of the front frame section bars 61 and 62. The front ends of the latter bars are brought together in converging relation, the forward portions 65 and 66 of the frame bars 61 and 62 extending generally in parallelism, as best shown in Figures 1 and 3, and are provided with a pair of apertures 67 (Figure 3) to receive bolt means 68 which are used to connect latch means 70 to the front end of the hitch structure 32. At the rear portion of the hitch structure 32, but forwardly of the transverse axis defined by the pivot members 39, the hitch frame 32 carries a pair of laterally spaced apart drawbar-receiving hook members 72, each including a base section 73, secured to the associated hitch frame member by a pair of bolts 74, a generally vertically extending connecting section 75, and a generally fore-and-aft extending section 76 spaced above the associated frame bar a distance sufficiently greater than the vertical dimension of the crossbar 22 of the tractor drawbar 19, as best shown in Figures 2 and 4. The latch unit 70 comprises a pair of interconnected side plates 81 and 82, the forward portions of which are formed as a pair of draft hooks 83, the side plates 81 and 82 being secured in place by the bolts 69, as best shown in Figure 3. The rear portions of the side plates 81 and 82 cooperate with a connecting strap 85 to form a latch box 86 in which a spring biased, longitudinally shiftable detent member 87 is disposed. The upper edge, indicated at 88 in Figure 3, of the detent member 87 extends downwardly and forwardly at an angle and the lower edge at the forward end of the detent member, indicated at 89 in Figure 4, is shaped so as to hold a cooperating tractor-carried part in operative engagement with the draft hook members 83. The detent member 87 may be moved rearwardly, against the bias of the associated spring (not shown) by means of a hand lever 91 pivotally mounted, as at 92, on a vertically extending bracket 93 which is fixed at its lower end, as by welding, to the generally central portion of the rear cross member 64 of the hitch frame structure. The lower end of the lever 91 is connected with the rear end of the detent 87 by means of a link 94. The spring normally holds the detent 87 in a forward position closely adjacent the draft hooks 83.

According to the present invention, we provide a draft-transmitting part 101 to be controllably engaged by the latch unit 70 and adapted to be mounted on a tractor, and left thereon, if desired. The draft-transmitting part 101 is best shown in Figure 3 and comprises a U-shaped rod member 102 having laterally extending ends 103 and 104 releasably disposed, respectively, in sleeves 105 carried by brackets 106, the laterally outer ends of which are turned upwardly and apertured so as to receive the pintles 16 on which the drawbar side members 21 are conventionally mounted. The sleeves 105 are detachably held in connected relation with the ends 103 and 104 of the central member 102 by pin means 108, and so long as the sleeves 105 are held by the pin means 108 in position on the ends of the member 101, the upwardly extended bracket ends are held in place on the tractor pintles 16. The central portion of the draft-transmitting pivot member 102 is shaped so as to lie in transverse alinement with the axis defined by the pintles 16, the central portion of the member 102 being that portion with which the latch 70 at the front end of the hitch frame 32 cooperates.

Means is provided for limiting the relative movement which may take place between the front and rear frame sections 31 and 32 about the transverse axis defined by the pivot pins or bolts 39. To this end, the upper end of the bracket 93 is bifurcated, as at 111, to provide a journal support for the upper forward end of a strut member 112, to the forward end of which a hand wheel 113 is fixed. The hand wheel 113 constitutes a forward stop, cooperating with the upper end of the bracket 93 to limit the rearward movement of the strut 112 relative to the bracket 93. To limit the forward movement of the strut 112 relative to the bracket 93, the strut 112 carries a rear collar 114. The rear end of the strut member is threaded, as indicated at 116 in Figure 1, and is received in a nut member 117 securely fixed, as by welding, to the forward ends of a pair of strap members 118, the rear ends of which are connected together by a cross piece 119 and, rearwardly of the cross piece 119, apertured to receive a pivot bolt 121 pivotally connecting the rear ends of the strap members 118 with a pair of brackets 122 fixed, as by welding, to the central portion of the rear cross frame angle 36 of the rear frame 31. The latter member carries stops 124 for limiting the angle to which the rear gangs 42 may be adjusted.

The operation of the implement and tractor outfit as described above is substantially as follows.

Figure 4 represents the positions of the parts when the harrow 1 is disconnected from the tractor. Before attempting to connect the harrow 1 to the tractor, the latter is equipped with the draft-transmitting part 101. This is done by taking out one of the pins 108 and removing one of the brackets 106 from the part 102. The other bracket of the unit 101 may then be brought into position under the drop axle housing sections and engaged with the pintle 16 at one side of the tractor. Next the sleeve 105 is passed over the end of the part 102 and maneuvered until the associated bracket 106 is brought into position over the other pintle 16. Then the pin 108 may be replaced, which locks the unit 101 in position on the tractor, with the central section of the member 102 in axial alinement with the pintles 16.

With the unit 101 attached, the tractor is then backed over the hitch structure 32 until the crossbar 22 of the tractor drawbar 19 engages the hook members 72, in about the position shown in Figure 4. Next the power lift unit 7 of the tractor is operated to raise the drawbar, and this exerts a force on the drawbar-receiving members 72 to raise the front end of the hitch frame 32, relative to the rear frame section 31, thus elevating the latch unit 70 and causing the angled edge 88 of the detent 87 to move upwardly past the central portion of the member 102 until the latter member lies behind the draft hooks 83, being the position shown in Figure 2, and then the spring associated with the detent 87 forces the latter forwardly into a position over the member 102, thus locking the front end of the implement frame to the tractor in draft-transmitting relation. These operations may all be performed by the operator sitting on the tractor. The harrow may then be elevated into a transport position by further raising movement of the tractor drawbar 19 to the upper range of its movement, the disks of the front and rear gangs 41 and 42 then being supported entirely out of contact with the ground, whereby the outfit may readily be driven from place to place, as desired. When the field is reached which it is desired to work, all the operator has to do is operate the valve lever 11 to lower the drawbar 19 of the tractor and the harrow is ready for operation, since the latch unit 70 retains the front end of the implement frame, particularly the draft frame section 32 thereof, interconnected with the drawbar-carried part 102. There is sufficient clearance between the upper drawbar-receiving sections 76 and the frame member 32 to accommodate a certain amount of vertical movement of the implement, relative to the tractor, about the axis defined by the part 102, and additionally, the main frame section 31 may pivot relative to the hitch frame section 32 a limited amount about the axis defined by the bolts 39, as determined by the clearance between the hand wheel 113 and the collar 114. In effect, therefore, the front and rear frame sections 31 and 32 are interconnected together by means that accommodates a limited amount of lost motion, and similarly, the hitch frame section 32 is connected with the drawbar 19 of the tractor by means which also affords a limited amount of lost motion. Additionally, the lateral spacing between the drawbar-engaging members 72 is such that there is clearance, or lost motion, between the members 72 and the side members 21 of the tractor drawbar 19, as shown in dotted lines in Figure 1, whereby the implement 1 may swing laterally relative to the tractor an amount sufficient to permit the outfit readily to negotiate fairly sharp turns either to the right or to the left, which makes the implement easily adapted for contour work and the like.

When it is desired to disconnect the implement from the tractor, the operator does not need to dismount from the tractor. To disconnect the implement, all that he needs to do is to grasp the hand lever 91 and swing the upper end forwardly, which exerts a pull through the rod 94 against the detent 87, which disconnects the same from the part 102 on the tractor. By virtue of the lost motion afforded between the upper end of the bracket 93 and the wheel 113 and collar 114, the front end of the hitch frame section 32 drops downwardly an amount sufficient to permit the forward parts to clear the tractor, as shown in Figure 4, thus permitting the tractor to be driven forwardly and away from the implement, the cross member 22 of the tractor drawbar passing above the latch unit 70, by virtue of the front end of the frame 32 falling downwardly, as just mentioned. By turning the hand wheel 113 and the strut member 112, the implement may be leveled as regards the working depth of the front gangs relative to the rear gangs, the collar 114 normally being held, by virtue of the forces arising from the soil resistance, against the upper end of the bracket 93. Preferably the parts are so adjusted that normally the cross member 22 of the tractor drawbar 19 occupies the position midway between the frame 32 and the upper drawbar-receiving sections 76, so that the implement is pulled entirely from the forward tractor-carried part 102 and the depth of operation of the front and rear tools controlled substantially entirely by the adjustment afforded by the rotatable strut member 112. As a result of this arrangement, the front end of the tractor may rise or fall relative to the implement, without materially affecting the uniform work performed by the front and rear tools.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention. For example, hitch structure of the type described above may be provided for implements other than pick-up disk harrows.

What we claim, therefore, and desire to secure by Letters Patent is:

For use with a tractor having a vertically swingable drawbar and means on the tractor for swinging said drawbar, the improvement comprising an implement including a frame, a drawbar-receiving member on said frame rearwardly of the front end thereof and adapted to receive said drawbar and to be lifted thereby when the drawbar is swung vertically, said member being open at one portion to provide for engagement and disengagement of the drawbar by movement thereof relative to the frame in a generally fore and aft direction, draft-transmitting latch means at the forward end of said frame normally disposed, when the implement is detached from the tractor, below the body of the tractor so as to provide for movement of the tractor over the forward portion of said frame to bring the drawbar into lifting engagement with said drawbar-receiving member, a cross member on the tractor adapted to be engaged by said first mentioned latch means by upward movement of the latter from below the cross member when the front end of said frame is raised by upward movement of said drawbar, said draft transmitting latch means including a pair of parts relatively movable in a generally fore-and-aft direction and facing upwardly so as to be engageable with said cross member when the front end of said frame is raised, one of said pair of parts being disposable in front of said cross member whereby forward motion of the tractor is transmitted through said one part to said implement frame; and means on the rear portion of said drawbar-receiving member for releasing said latch means to provide for disconnection of the tractor from said implement.

References Cited in the file of this patent

UNITED STATES PATENTS

| | | |
|---|---|---|
| 2,005,555 | Morkovski | June 18, 1935 |
| 2,048,055 | Boecker | July 21, 1936 |
| 2,158,780 | Vogt | May 16, 1939 |
| 2,192,877 | Winsor et al. | Mar. 12, 1940 |
| 2,228,508 | Crumb et al. | Jan. 14, 1941 |
| 2,252,691 | Arndt | Aug. 19, 1941 |
| 2,320,168 | Benjamin et al. | May 25, 1943 |
| 2,320,624 | Love | June 1, 1943 |
| 2,336,848 | Cruse | Dec. 14, 1943 |
| 2,483,565 | Strandlund | Oct. 4, 1949 |
| 2,489,274 | Donald | Nov. 29, 1949 |
| 2,527,355 | Cook et al. | Oct. 24, 1950 |
| 2,576,779 | Court | Nov. 27, 1951 |
| 2,619,889 | Johnson | Dec. 2, 1952 |
| 2,662,459 | Shore | Dec. 15, 1953 |
| 2,697,973 | Silver et al. | Dec. 29, 1954 |